US011969392B2

(12) United States Patent
Yeates

(10) Patent No.: US 11,969,392 B2
(45) Date of Patent: Apr. 30, 2024

(54) HANDHELD COSMETIC DEVICE THAT OPERATES AT MULTIPLE FREQUENCIES

(71) Applicant: L'OREAL, Paris (FR)

(72) Inventor: Kyle Harris Yeates, Redmond, WA (US)

(73) Assignee: L'OREAL, Paris (FR)

(*) Notice: Subject to any disclaimer, the term of this patent is extended or adjusted under 35 U.S.C. 154(b) by 383 days.

(21) Appl. No.: 17/137,534

(22) Filed: Dec. 30, 2020

(65) Prior Publication Data

US 2021/0196557 A1 Jul. 1, 2021

Related U.S. Application Data

(60) Provisional application No. 62/955,118, filed on Dec. 30, 2019.

(51) Int. Cl.

| | |
|---|---|
| ***A61H 7/00*** | (2006.01) |
| ***A46B 7/04*** | (2006.01) |
| ***A46B 13/00*** | (2006.01) |
| ***A46B 13/02*** | (2006.01) |
| ***A61H 23/02*** | (2006.01) |

(52) U.S. Cl.

CPC ............. *A61H 7/005* (2013.01); *A46B 7/042* (2013.01); *A46B 13/008* (2013.01); *A46B 13/023* (2013.01); *A61H 23/0263* (2013.01); *A46B 2200/102* (2013.01); *A61H 2201/10* (2013.01)

(58) Field of Classification Search

CPC ....... A46B 13/008; A46B 13/06; A46B 13/02; A46B 13/023; A46B 2200/102

See application file for complete search history.

(56) References Cited

U.S. PATENT DOCUMENTS

| | | | | |
|---|---|---|---|---|
| 6,032,313 A * | 3/2000 | Tsang | A47L 11/4038 451/259 |
| 9,107,486 B2 * | 8/2015 | Brewer | A45D 34/042 |
| 2019/0191937 A1 * | 6/2019 | Straka | A47K 7/043 |
| 2021/0045521 A1 * | 2/2021 | Goldberg | A46B 7/042 |

* cited by examiner

*Primary Examiner* — Shay Karls

(74) *Attorney, Agent, or Firm* — Oblon, McClelland, Maier & Neustadt, L.L.P.

(57) ABSTRACT

A personal care appliance is provided that includes an applicator head that includes at least a first applicator surface and a second applicator surface, each being configured to contact a skin surface of a user; an appliance body having a motor assembly for oscillating the applicator at a first frequency corresponding to the first applicator surface and a second frequency corresponding to the second applicator surface.

5 Claims, 8 Drawing Sheets

HANDHELD COSMETIC DEVICE THAT OPERATES AT MULTIPLE FREQUENCIES

CROSS-REFERENCE TO RELATED APPLICATIONS

This application claims the benefit of U.S. Provisional Application No. 62/955,118 filed Dec. 30, 2019, the entire contents of which are incorporated herein by reference.

BACKGROUND

Field

The present disclosure describes a skin treatment device configured to oscillate at multiple frequencies depending on a function or type of applicator which is to be used.

SUMMARY

In an embodiment, a personal care appliance is provided comprising: an applicator head that includes at least a first applicator surface and a second applicator surface, each being configured to contact a skin surface of a user; an appliance body having a motor assembly for oscillating the applicator at a first frequency corresponding to the first applicator surface and a second frequency corresponding to the second applicator surface.

In an embodiment, the first applicator surface includes brush bristles and the second applicator surface is made of an elastomeric material.

In an embodiment, the personal care appliance includes a controller configured to control the motor assembly to alternate oscillation between the first frequency and the second frequency according to predetermined routine.

DETAILED DESCRIPTION

The present disclosure describes systems, methods, and related devices to operation of a personal care appliance. The personal care appliance can be used to perform a routine for skin care of a user. The routine can include one or more regimens, where each regimen has a set of protocols. An example of a protocol includes using a personal care appliance having an applicator to condition the user's skin by applying a particular applicator surface feature, oscillating at a particular oscillation, to a particular portion of the user's skin for a particular duration.

The disclosed embodiments include a handheld personal care appliance or appliance having a motor assembly for oscillating an applicator at an oscillation including a frequency and amplitude. The applicator can have one or more sets of bristles in addition to an elastomeric surface for applying to a person's face or body.

A conventional brushhead for use with a personal care appliance is an exfoliating brushhead for treating a user's epidermis as described in U.S. Pat. No. 9,107,486 incorporated herein by reference. In one embodiment, the motor assembly can produce motion at sonic frequencies. The amplitude can be described as a displacement or an angle according to an example. An exemplary device for providing oscillating sonic movement is the Clarisonic brush (Clarisonic, Redmond, WA) described in U.S. Pat. No. 7,320,691, incorporated herein by reference in its entirety, which describes an optimal frequency for providing oscillating sonic movement.

In one example, the motor assembly is configured to produce an oscillation frequency of less than 200 Hz. In one example, the motor assembly is configured to produce an oscillation frequency of greater than 10 Hz. The brushhead and the set of bristles can create a second order mechanical dynamic motion.

Figure 1B:
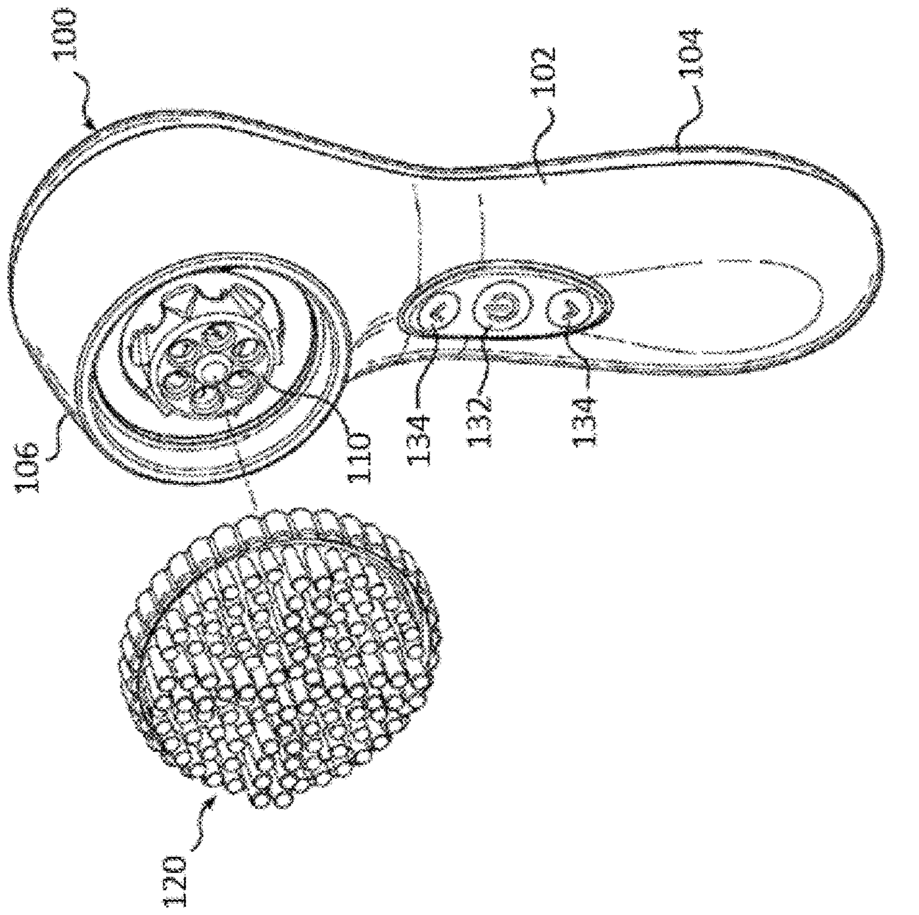
FIGS. 1A-1B shows perspective drawings of a conventional appliance having a brushhead according to an example.
Figure 1A:
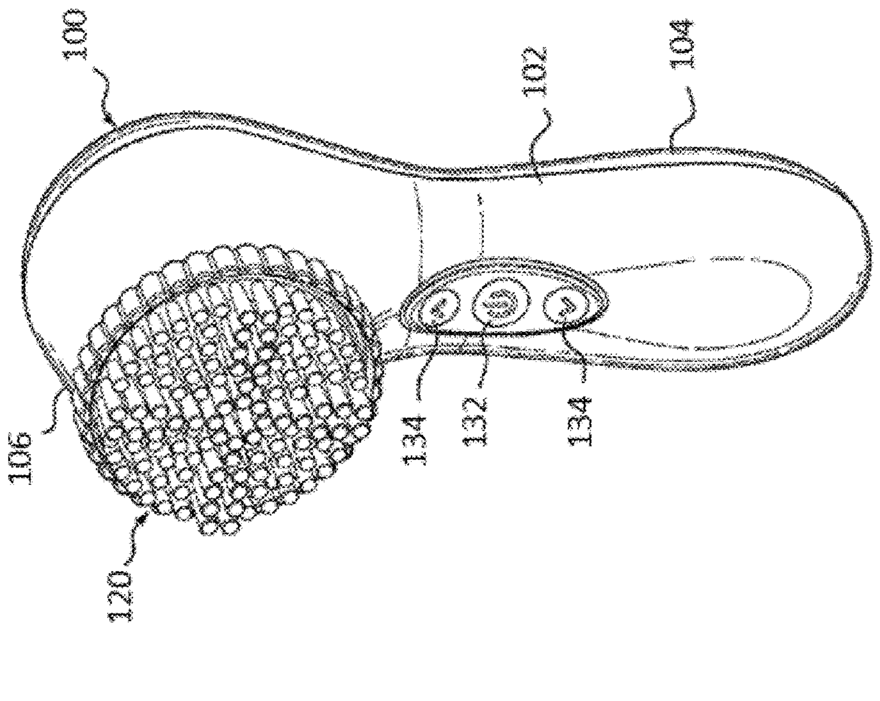

The motor assembly can have an optimal oscillation frequency unique to each manufactured appliance and in concert with an attached brush or implement. The optimal oscillation frequency can have secondary effects on another appliance part such as the power storage source, the motor assembly, as well as cause heating. FIGS. 1A-1B show perspective drawings of an appliance 100 according to this conventional example. The appliance 100 includes a body 102 having a handle portion 104 and a head attachment portion 106. The head attachment portion 106 is configured to removablely attach a head, such as brushhead 120, to the appliance 100.

Figure 2A:
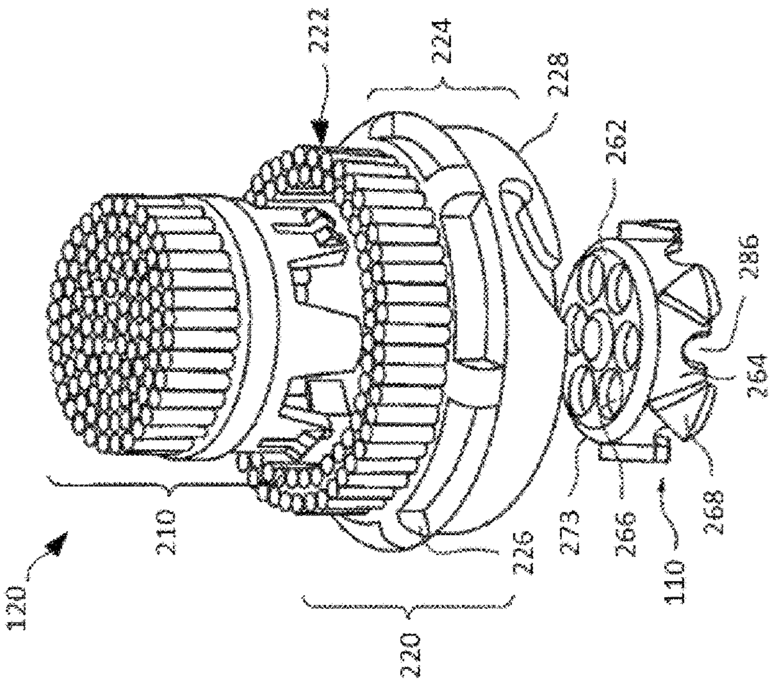
FIGS. 2A-2C shows a perspective view of a brushhead attachment mechanism including a drive hub of the appliance and the brushhead divided into an outer brushhead portion and an inner brushhead portion according to an example.

Next, parts of the brushhead are described in different examples. Referring now to FIG. 2A, a brushhead attachment mechanism can include an inner brushhead portion 210, interfacing with the drive hub 110, which oscillates through a selected angle or amplitude during operation of the appliance 100.

Returning to FIG. 2A, the brushhead 120 optionally can include an outer brushhead portion 220, which remains stationary during operation of the appliance 100. In an embodiment shown in FIGS. 2A and 2C, a row(s) of bristle tufts are circular and move in an arcuate manner with an axis of rotation perpendicular to a surface of the skin. FIGS. 2A and 2C show an embodiment in which a set of rows 212 move and an optional set of rows 222 are fixed.

The inner brushhead portion 210 has an operative relationship with the drive hub 110 such that as the drive hub 110 oscillates through a selected angle, so does the inner brushhead portion 210. The outer brushhead portion 220 includes a central, cylindrically shaped opening. The central opening is sized and configured to surround the sides of the inner brushhead portion 210. When attached to the appliance 100, a rim, which extends around the top periphery of the central opening, is flush with or positioned slightly above the outwardly facing surface of the body 102.

In some embodiments, the inner brushhead portion 210 and the outer brushhead portion 220 together include a brushhead attachment mechanism configured to provide selective attachment of the brushhead 120 to the head attachment portion 106 of the appliance 100.

In the embodiment shown, the outer brushhead portion 220 is annular, with an outside diameter of approximately 1.975 inches, with a central opening. The outer brushhead portion 220 includes a base portion 224 with a rim around the top periphery thereof which includes a plurality of spaced finger grips 226, which helps the user in installation and removal of the brushhead 120. The outer brushhead portion 220 can further include a plurality of brushhead bristles 222 which extend upwardly from the base portion 224. There may be a gap or space between the bristles of the inner and outer brushhead portions, in the range of 0.050-0.125 inches, preferably 0.084 inches.

When attached to the appliance 100 by the brushhead attachment mechanism, the following occurs: (1) the inner brushhead portion 210 is operatively connected to the motor assembly 112, for example, via a drive hub 110, in a manner that provides oscillating motion thereto; and (2) the outer brushhead portion 220 fixedly secures the brushhead 120 to the head attachment portion 106 of the appliance 100.

Accordingly, the brushhead attachment mechanism in some embodiments provides a quick and easy technique for attaching and detaching the brushhead 120 to the appliance 100. It will be appreciated that the brushhead attachment mechanism also allows for other personal care heads to be attached to the appliance, and allows for a replacement brushhead 120 to be attached to the appliance 100, when desired. One brushhead attachment mechanism that may be practiced with embodiments of the present disclosure is set forth in U.S. Pat. No. 7,386,906, the disclosure of which is hereby incorporated by reference in its entirety.

It will be appreciated that other brushhead attachment mechanisms can be employed to provide either tooled or tool-less techniques for selectively attaching the brushhead 120 to a personal care appliance, such as appliance 100, in a manner that (1) provides oscillating motion to the inner brushhead portion 210; and (2) maintains the connection between the inner brushhead portion 210 and the motor assembly 112. For example, in some embodiments, the inner brushhead portion 210 includes a coupling interface configured to cooperatingly connect to an oscillating drive shaft or armature, such as armature 114, of an associated motor assembly 112 in a manner that transmits oscillating motion to the inner brushhead portion 210.

The above-described examples of the brushhead 120 can be used to exfoliate skin of a user's epidermis. In that regard, the brushhead 120 is first attached to the appliance 100. Next, if desired, a skin softening agent, such as skin care formula, can be placed on the tips of bristles of a first group of tufts 212.

Figure 2B:
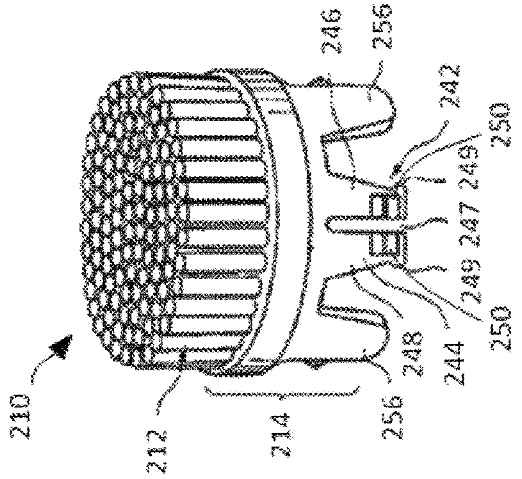
Figure 2C:
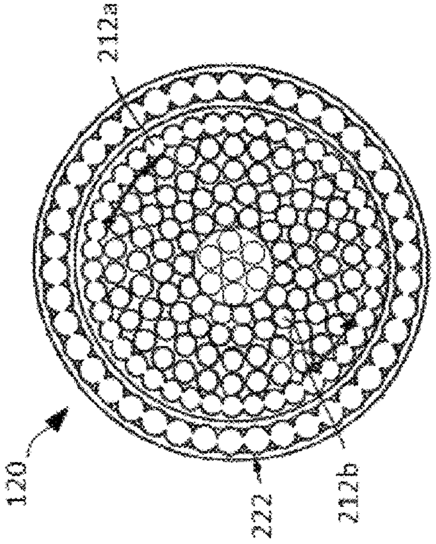

FIG. 2B shows the inner brushhead portion 210 in more detail in according to an example. The inner brushhead portion 210 has a generally circular configuration and is arranged to fit into the central opening of the outer brushhead portion 220.

The inner brushhead portion 210 includes a plurality of inner brushhead bristles 212 which extend upwardly from a base portion 214, with the bristles 212 arranged in a circular pattern covering the entire upper surface of the base portion 214.

The inner brushhead portion 210 in the embodiment shown includes two sets of depending legs on the outer periphery thereof. The first set of three legs 242-242, spaced at 120° intervals, each leg having a pair of snap portions 244 and 246, defined by a slot 247 which extends down the middle of each snap leg 242.

The two snap portions of each snap leg are configured and arranged to slightly flex toward each other during installation of the inner brushhead portion 210 on the drive hub 110, with the outside edges of the free tips of the snap portions 244, 246 having outward bulges 249-249 which snap back (with the snap portions) after they pass over a pointed portion of the drive hub 110, helping to tightly engage the drive hub 110 and retain the inner brushhead portion 210 on the drive hub 110.

The inner brushhead portion 210 further includes a second trio of spaced drive legs 256-256. The drive legs 256 alternate with snap legs 242 around the periphery of inner brushhead portion 210 and are also separated by 120° intervals.

The drive legs 256 taper slightly from their base to their free ends, which are rounded, designed to provide a close tolerance fit between them and the drive hub 110.

The brushhead structure and assembly is described in more detail in U.S. Pat. No. 7,386,906, which is owned by the assignee of the present application and is incorporated herein by reference in its entirety.

FIG. 2C shows a top view of the brushhead bristle arrangement according to an example. The plurality of inner brushhead bristles 212 with an outer-most row of bristles 212*a*. During oscillation, the outer-most row of bristles 212*a* will have a greater linear amplitude as compared to another row of bristles 212*b*, approximately according to $r \cdot \theta$, where r is a radius from a center of the brushhead and $\theta$ is an angle of oscillation in radians.

The brushhead bristle arrangement shown and described herein, used in the appliance/brushhead disclosed in the above applications is effective for skin cleaning applications, particularly facial skin. The present brushhead bristle arrangement can also be used in other skin care applications, however, as discussed in the above applications, including acne and black head treatment, athlete's foot treatment, callused skin and psoriasis, razor bumps and related skin applications, wound cleansing and treatment of slow or non-healing wounds, scalp cleaning, chemical peel procedures and shaving cream applications. Preferred bristle configurations and arrangements will differ somewhat depending upon the particular application.

Figure 3:
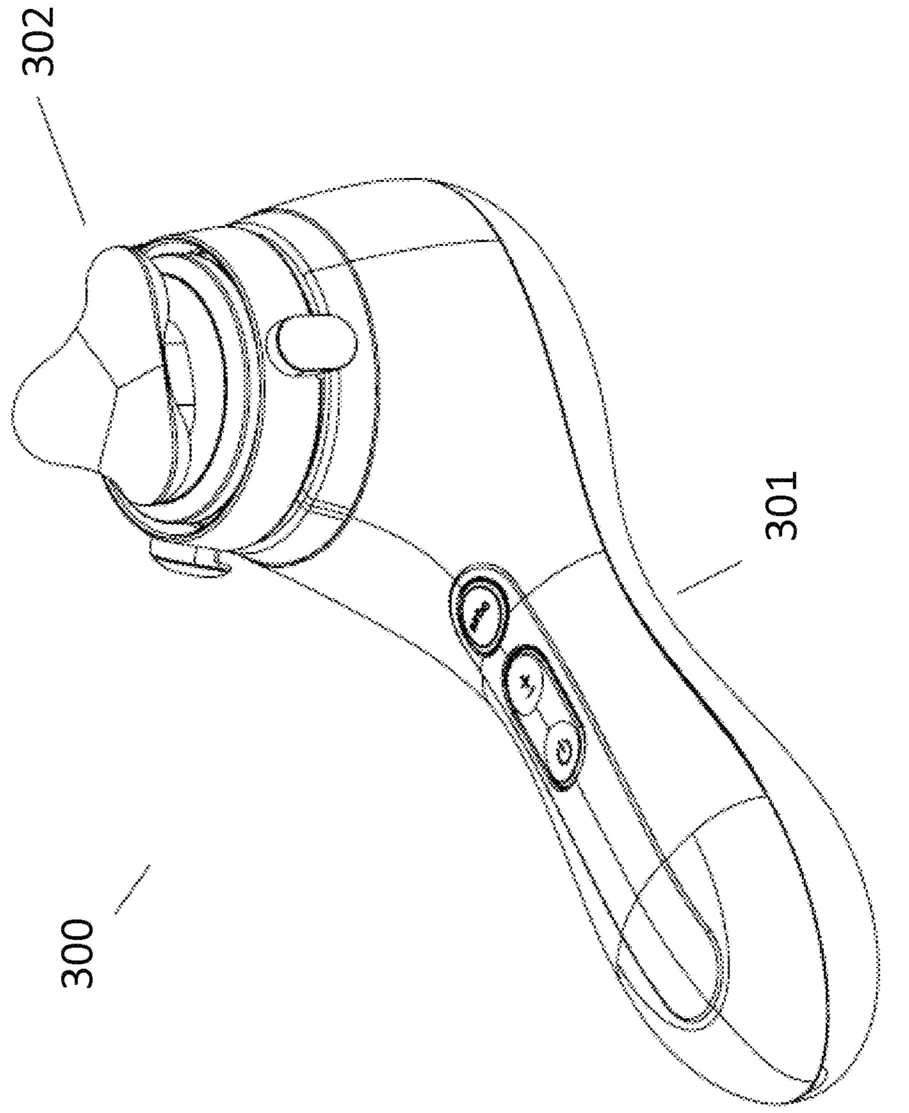
FIG. 3 shows a conventional appliance with a massaging head attached to a main body.

FIG. 3 shows another conventional personal cosmetic appliance 300. The device 300 includes a main unit 301 and a detachable unit 302. The personal cosmetic appliance 300 shown in FIG. 3 is used for massaging and/or cleansing a user's skin using a three-headed massaging applicator, with an elastomeric surface, as shown on the detachable unit 302. The main unit provides power and control of the overall device including the detachable unit 302.

Figure 4:
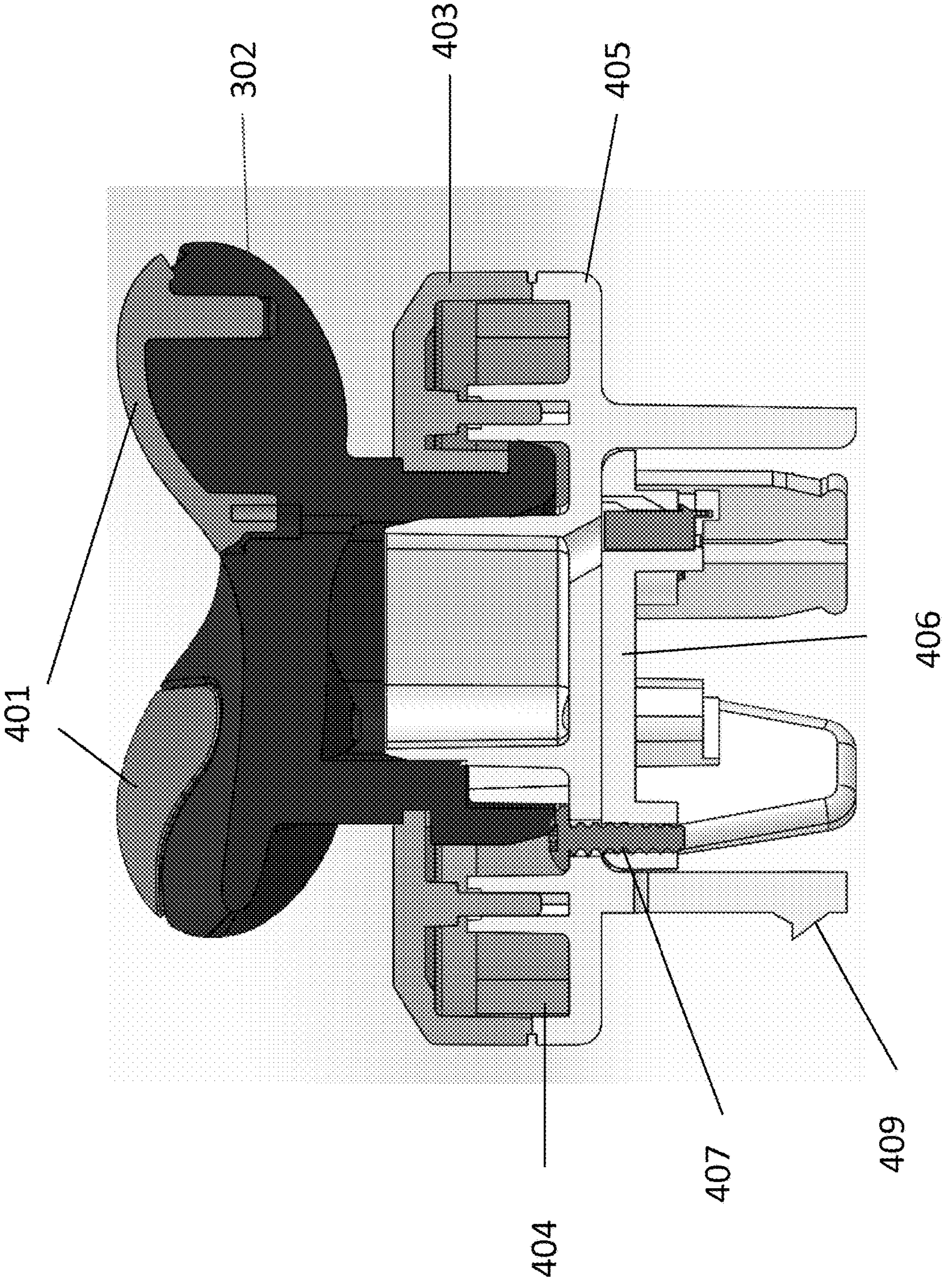
FIG. 4 shows a cross-sectional view of the massaging head for the appliance shown in FIG. 3.

FIG. 4 shows details of the detachable unit 302. The detachable unit 302 includes the skin contacts 401 which are inserted upon cosmetic head portion 302. The cosmetic head portion is held in place by the 'sandwiching' of an applicator top housing 403 and bottom housing 405. Inertial mass 404 is added to the detachable unit to allow the motor assembly to drive the applicator assembly at a specific oscillation frequency. Additionally, stage 406 is attached to the interface portion 405 via screws 407. Also, the interface portion 405 includes legs 409.

Figure 5:
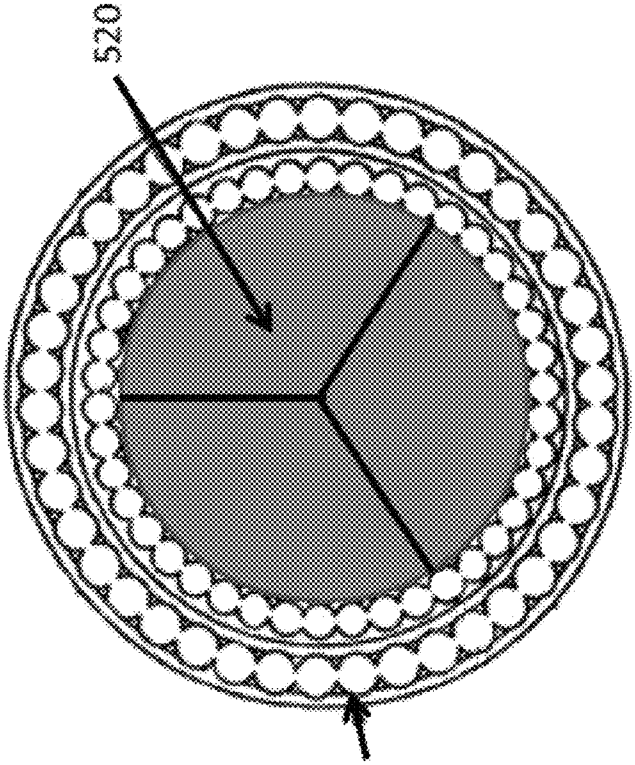
FIG. 5 shows an applicator head having two different types of applicator regions according to an embodiment.

As can be seen in FIGS. 1-3, there may be two different types of applicator heads, one with oscillating bristles, and one with an oscillating massage head. FIG. 5 shows an embodiment of a personal cosmetic appliance the present application which includes a combination of the features of FIGS. 1-2. The appliance includes an applicator head 500 which includes a first region 510 which includes a bristle arrangement on outer concentric circles, and a second region 520 which includes an elastomeric material. The inner second region may be disposed within the concentric circles of the bristles similar to the insertion of inner brushhead portion 210 shown in FIG. 2A-2B. Alternatively, the inner portion of the applicator head may accommodate insertion of massage heads similar to the head portion 302 shown in FIGS. 3-4.

Figure 6:
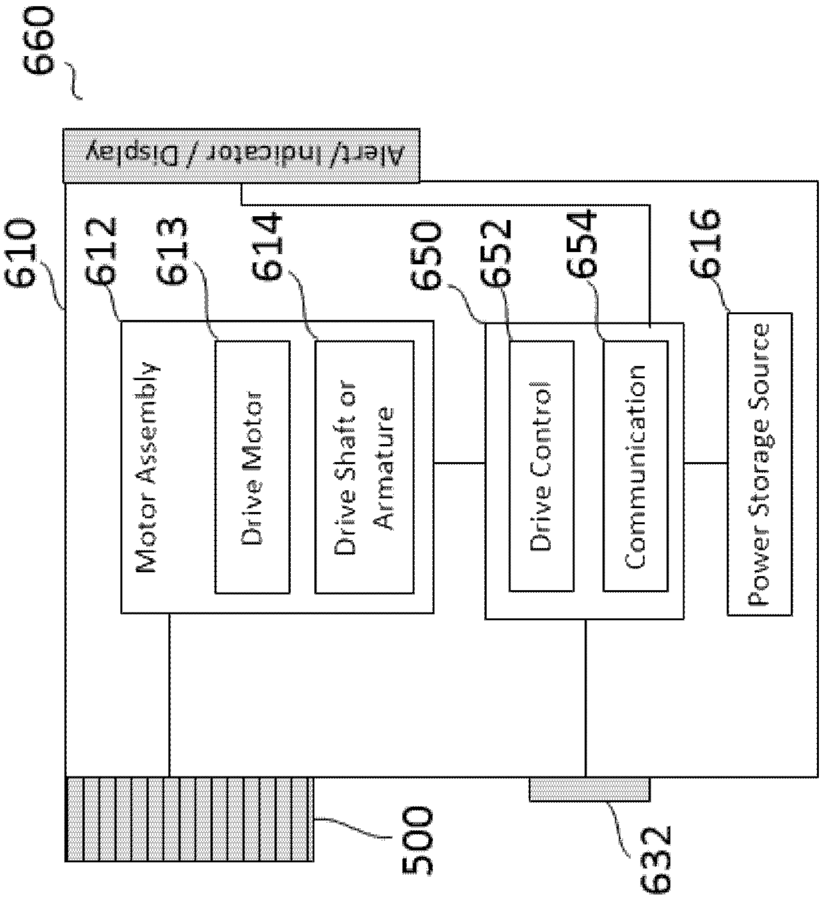
FIG. 6 shows the hardware and components of the personal care appliance according to an embodiment.

The body 610 of the personal cosmetic appliance according to the embodiment houses an operating structure of the appliance. As shown in a block diagram form in FIG. 6, the operating structure in one embodiment includes a motor assembly 612, a power storage source 616, such as a rechargeable battery, and a controller 650. The controller 650 includes a drive control 652 and a communication part 654. In an aspect, the controller 650 can be controlled by on/off button 632 configured and arranged to selectively connect power from the power storage source 616 to the motor assembly 112. The power storage source 616 can be charged by power delivered by a cable connected to the appliance (not shown). In an alternative embodiment the power storage source 616 can be charged by any wireless means including by pLink charging system, inductive Qi charging system and AirFuel.

In an example the communication part 654 can include circuitry and hardware for communication with an external client device (such as a smartphone). In an example the communication part 654, or optionally the drive control 652, can include circuitry and hardware for communication with an alert part, an indicator, or a display 660. The communication part 654 can include a CPU, a I/O interface, and a network controller such as BCM43342 Wi-Fi, Frequency Modulation, and Bluetooth combo chip from Broadcom, for interfacing with a network. The hardware can be designed for reduced size. For example, the CPU may be an APL0778 from Apple Inc., or may be other processor types that would be recognized by one of ordinary skill in the art. Alternatively, the CPU may be implemented on an FPGA, ASIC, PLD or using discrete logic circuits, as one of ordinary skill in the art would recognize. Further, the CPU may be implemented as multiple processors cooperatively working in parallel to perform the instructions of the inventive processes described above.

In some embodiments, the controller 650 incudes a programmed microcontroller or processor, which is configured to control the oscillation of the applicator head 500 by delivery of power to the motor assembly 612. In an aspect, either the drive control 652 or the communication part 654 can include the CPU, memory and store a usage of each brushhead uniquely and by the type of brushhead according to an example.

The motor assembly 612 in some embodiments includes an electric drive motor 613 that drives an attached applicator head 500, via a drive shaft or armature 614. When the applicator head 500 is mounted, the motor assembly 612 is configured to impart motion to the applicator head 500.

The motor assembly 612 may be configured to oscillate the bristle portion 510 and the elastomeric portion 520 at different frequencies and at different times if necessary. For instance, the bristle portion may be oscillated at sonic frequencies, typically in the range of 80-300 Hz, oscillating the bristles back and forth within a range or amplitude of 3-20 degrees.

The motor assembly 612 may be configured to oscillate the bristles or the elestmeric region at a natural resonance or resonant frequency as determined by: $2\pi \cdot F = \sqrt{K/J}$, where K is a system spring rate, J is a oscillating inertia, and F is the resonant frequency in Hertz. Loading the bristles causes a change in the spring rate due to bristle bending and a change in system inertia by removing free bristle tips from an oscillating mass.

In some embodiments, the bristle portion is operated in loaded or unloaded conditions at frequencies from about 40 Hz to 300 Hz with a range of about 3-17 degrees. In other embodiments, the brushhead 120 is operated in a loaded condition at frequencies from about 40 Hz to 300 Hz, a range or amplitude of 8-12 degrees, and a duty cycle of about 38-44%.

One example of a motor assembly 112 that may be employed by the appliance 100 to oscillate the applicator head is shown and described in U.S. Pat. No. 7,786,626, the disclosure of which is hereby incorporated by reference in its entirety. However, it should be understood that this is merely an example of the structure and operation of one such appliance and that the structure, operation frequency and oscillation amplitude of such an appliance could be varied, depending in part on its intended application and/or characteristics of the brushhead 120, such as its inertial properties, etc.

In some embodiments of the present disclosure, the frequency ranges are selected so as to drive either the bristle portion and or the elastomeric portion at or near resonance. Thus, selected frequency ranges are dependent, in part, on the inertial properties of the each applicator region.

Frequency ranges may be used as described in U.S. Pat. Nos. 9,925,113, 9,925,112, 9,925,111, and 10,098,808, each of which is hereby incorporated by reference. For example, specific frequencies may be used at 40, 60, 75, 90, and 120 Hz depending on the objective. A desired frequency range may be between 30-50 Hz, 60-90 Hz, or 110-130 Hz depending on the objective It will be appreciated that driving the attached head at near resonance provides many benefits, including the ability to drive the attached head at suitable amplitudes in loaded conditions (e.g. when contacting the skin) while consuming the least amount of energy from the power storage source. For a more detailed discussion on the design parameters of the appliance, please see U.S. Pat. No. 7,786,626, incorporated herein by reference in its entirety.

Figure 7:
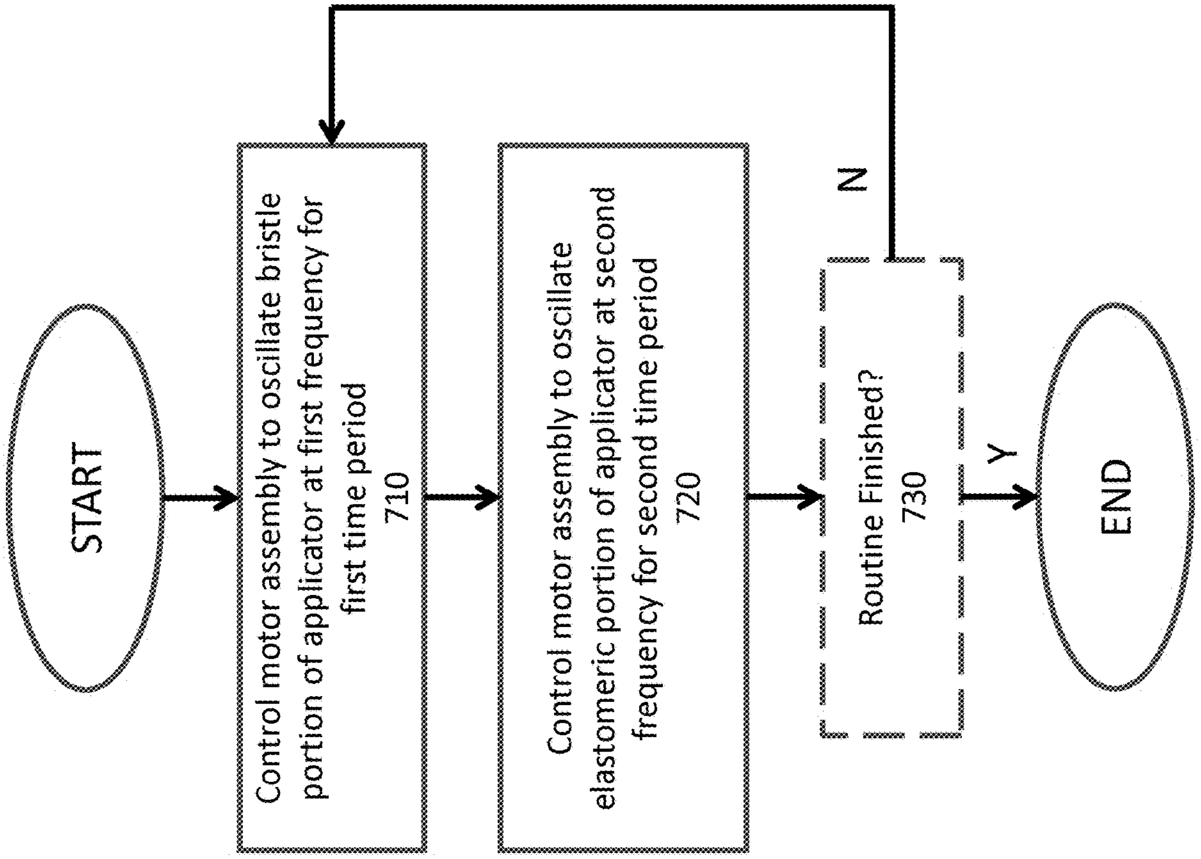
FIG. 7 shows a process performed by the personal care appliance according to an embodiment

FIG. 7 is a flow diagram describing a process performed at least in part by the appliance according to an example. A routine may be stored at the appliance for operating both the bristled region of the applicator and the elastomeric region of the applicator at alternating time periods and at alternating frequencies. At step 710, the motor assembly is controlled to oscillate the bristled portion of the applicator at a first frequency for a first time period. At step 720, the motor assembly is configured to oscillate the elastomeric portion of the applicator at a second frequency for a second time period. This alternating sequence may be repeated until a predetermined end of the routine is reached at step 730. Alternatively, any of steps 710-730 may be controlled manually by the user.

Figure 8B:
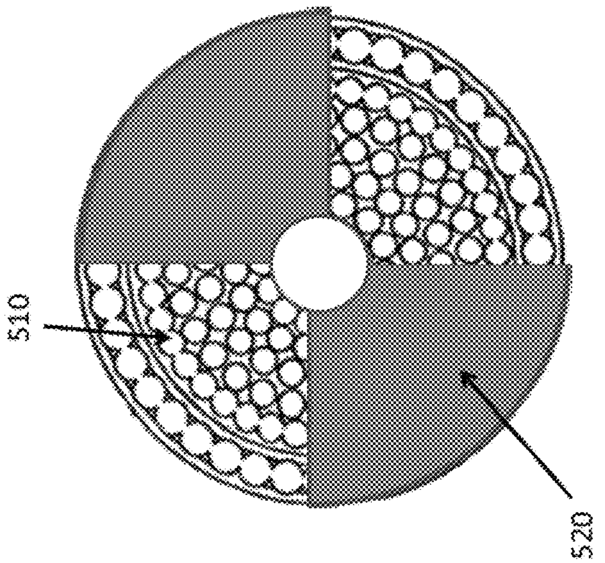
FIGS. 8A and 8B show alternative arrangements the different types of applicator regions according to embodiments.
Figure 8A:
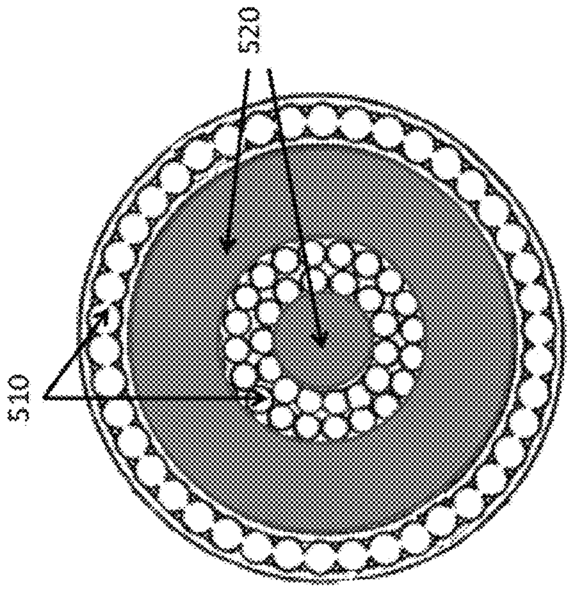

FIGS. 8A-8B shows alternative embodiments which feature different arrangements of the bristled regions and the elastomeric region. FIG. 8A shows an embodiment in which the bristled regions 510 and the elastomeric region 520 are alternatively disposed as concentric circles. FIG. 8B shows an embodiment in which the bristled regions 510 and the elastomeric region 520 are alternatively disposed as radial sections. Any other type of arrangement patterns may be utilized.

Additional features may be included in the appliance to enhance effectiveness of skin treatment.

A topical solution may be dispensed from the appliance before or during treatment to enhance a cleansing or massaging effect.

Either of the bristled portion or the elastomeric portion may be mechanically raised or retracted so that a bristled portion or elastomeric portion becomes isolated as the only region to contact the skin.

Obviously, numerous modifications and variations of the present invention are possible in light of the above teachings. It is therefore to be understood that within the scope of the appended claims, the invention may be practiced otherwise than as specifically described herein.

The invention claimed is:

1. A personal care appliance comprising:

an applicator that includes at least a first applicator surface and a second applicator surface, each being configured to contact a skin surface of a user; and an appliance body having a motor assembly for oscillating the applicator at a first frequency corresponding to the first applicator surface and a second frequency corresponding to the second applicator surface, wherein the first applicator surface includes brush bristles and the second applicator surface is made of a smooth elastomeric material without any brush bristles, and wherein the first applicator surface is disposed on outer concentric circles of the applicator and the second applicator surface is disposed within the outer concentric circles of the applicator.

2. The personal care appliance according to claim 1, further comprising a controller configured to control the motor assembly to alternate oscillation between the first frequency and the second frequency according to predetermined routine.

3. A method, implemented by a personal care appliance, comprising:

contacting, with an applicator, a skin surface of a user, the applicator including at least a first applicator surface and a second applicator surface; and oscillating with an appliance body having a motor assembly, the applicator at a first frequency corresponding to the first applicator surface and a second frequency corresponding to the second applicator surface, wherein the first applicator surface includes brush bristles and the second applicator surface is made of a smooth elastomeric material without any brush bristles, and wherein the first applicator surface is disposed on outer concentric circles of the applicator and the second applicator surface is disposed within the outer concentric circles of the applicator.

4. An applicator for a personal care appliance, comprising:

a first applicator surface; and a second applicator surface, wherein each of the first applicator surface and the second applicator surface is configured to contact a skin surface of a user, wherein the applicator is configured to be oscillated at a first frequency corresponding to the first applicator surface and a second frequency corresponding to the second applicator surface, wherein the first applicator surface includes brush bristles and the second applicator surface is made of a smooth elastomeric material without any brush bristles, and wherein the first applicator surface is disposed on outer concentric circles of the applicator and the second applicator surface is disposed within the outer concentric circles of the applicator.

5. The applicator according to claim 4, wherein the first applicator surface and the second applicator surface are alternatively disposed as concentric circles on the applicator.

* * * * *